United States Patent Office 3,261,688
Patented July 19, 1966

3,261,688
GROWTH PROMOTING AGENTS
Winfred N. McCutchan, Terre Haute, Ind., assignor to Commercial Solvents Corporation, New York, N.Y., a corporation of Maryland
No Drawing. Filed Sept. 11, 1961, Ser. No. 137,007
5 Claims. (Cl. 99—9)

My invention relates to growth promoting agents. More particularly, my invention relates to the production of substances which are particularly useful for stimulating the growth of animals.

One trend in modern livestock production is toward producing animals with a rapid rate of growth. This permits early marketing of such animal which results in great savings to the animal producer. During recent years many substances have been found to aid in increasing the rate of growth in animals such as lambs, swine, and chicks. Wide uses of vitamins such as vitamin A and vitamin D, antibiotics such as penicillin and bacitracin, and enzymes such as papain and trypsin have been made to promote more rapid growth in animals.

I have now discovered that the organism *Bacillus licheniformis* has the ability to produce, by biosynthesis, growth promoting agents useful for stimulating the growth of lambs, poultry and other animals. The microorganism, *Bacillus licheniformis*, also has the ability to produce bacitracin in conjunction with the production of my newly discovered growth promoting agents. However, the growth-promoting value of my agents is not due to the presence of bacitracin since growth responses are produced when bacitracin has been separated from the elaboration product of the organism. The bacitracin-free elaboration products of the organism have previously been regarded as useless, and after separation of bacitracin using bacitracin recovery techniques, they have heretofore been discarded. Thus, concentrated preparations from the culture of *Bacillus licheniformis* give a growth response to animals which cannot be attributed to bacitracin. Although it is presently not known whether the growth stimulating properties of the bacitracin-free elaboration product of the microorganism are due to constituents of an antibiotic or a vitamin character, the fact remains that important growth responses are obtained from their use.

In preparing the growth promoting agents of my invention, the microorganism *Bacillus licheniformis* is cultured on an aqueous nutrient medium, preferably under aerobic, submerged conditions. The thus produced growth stimulating agents are then recovered from the medium and fed directly to animals by incorporation in conventional feeds. Preferably, the agents are first concentrated by drying to produce a more highly potent preparation. The amount of dried, concentrated growth promoting material needed to produce the desired growth stimulation will vary widely depending on the potency of the particular product and on the degree of growth stimulation desired. In general I have discovered that concentrations even lower than 0.001% of dried whole bacitracin-free elaboration product in the ration produce desirable growth stimulation.

In culturing *Bacillus licheniformis* an inoculum of the microorganism is grown in an aqueous fermentation medium containing an energy source, a nitrogen source, and suitable minerals at temperatures preferably ranging from about 35 to about 40° C. for a period of one to three days. The inoculum is generally prepared by transplanting the culture into shallow layers of a suitable medium in an Erlenmeyer flask and incubating the medium for about 24 to 36 hours at about 37° C. using a shake technique.

The energy source to be utilized in the fermentation medium can be a carbohydrate such as sucrose, dextrose, starch, etc., or if preferred, a polyhydric alcohol such as glycerol or sorbitol.

The nitrogen source can be an organic nitrogen source such as yeast extract, hydrolyzed proteins, soybean meal and urea or an inorganic nitrogen source such as ammonia, ammonium phosphate, ammonium acetate, etc.

It is often desirable, in addition to the energy and nitrogen sources, to incorporate into the medium trace amounts of mineral nutrients such as the phosphate, sulfate, citrate, nitrate and acetate salts of potassium, the zinc, ferrous, magnesium, cobalt, and calcium chlorides. However, in many areas, many or all of these minerals are present in proper amounts in the water to be used in the fermentation medium.

As previously stated above, it is preferable to carry out the fermentation of *Bacillus licheniformis* in an aqueous medium under aerated and submerged conditions so as to provide rapid growth of the microorganism and proper utilization of the nutrients in the medium. While agitation is not required, it is often preferred. Any suitable techniques of aeration and agitation known to the art can be utilized in my process. Also, during fermentation, excessive foaming is sometimes encountered. Such foaming can be controlled by incorporating an anti-foam agent such as lard oil into the medium.

Temperatures utilized in the fermentation procedure can range from about 35 to 40° C. It is preferable, however, for optimum results, to utilize a temperature of about 37° C.

Since bacitracin is produced concurrently with my new growth-promoting agents, it is necessary, in order to isolate the agents, to first separate them from bacitracin. Generally, the cells containing the growth-promoting agents can be recovered by centrifugation of the fermentation medium and decantation of the bacitracin-containing liquid from the solid material containing the growth promoting agents. The thus separated cells can then, if desired, be treated with butanol to remove residual bacitracin. In an alternate procedure, separation of the growth-promoting agents from the concurrently produced bacitracin can be attained by extracting the fermentation medium with butanol to remove bacitracin. The bacitracin-free residue can then, if desired, be centrifuged and the liquid material removed from the cells by decantation.

As previously stated, after initial separation from the bacitracin, the cells containing the growth-promoting agent can be incorporated in animal feeds to give the desired result. However, it is generally preferable to first concentrate the material to a solid dry state in order to facilitate further handling of the material. The cells can be concentrated to a solid state by the use of apparatus to carry out dehydration such as spray dryers, drum dryers, tray dryers, etc. To prevent heat damage to the product, it is often preferable to not exceed temperatures of from about 150–200° C. during drying thus preserving full potency of the dried material.

The following examples serve to demonstrate my invention; however, it is not intended that my invention be limited to the specific procedures, proportions, or fermentation medium employed therein.

*Example 1*

An aqueous fermentation medium containing the following proportions of ingredients was prepared.

| | Percent |
|---|---|
| Soybean meal | 8 |
| Starch | 2 |
| $CaCO_3$ | 0.25 |
| Lard oil | 0.234 |

A 50-liter portion of the above medium was inoculated with 1,000 ml. of a shake flask culture of *Bacillus licheni-*

*formis.* The thus inoculated medium was fermented at 37° C. for 24 hours during which period air was forced into the medium at approximately 20 liters per minute. At the end of the 24-hour period, fermentation was halted and the fermentation medium was centrifuged to separate solid and liquid components. The aqueous component was removed from the fermentation medium by decantation and the solid material was dried by spray drying to give a solid product suitable for incorporation in animal feeds as growth stimulants.

*Example II*

To demonstrate the effectiveness of my new growth-promoting agents, lambs were fed a complete feed containing 0.001% of the dried material of Example I; the average daily weight gain and the feed conversion of these lambs were then compared with the average daily weight gain and the feed conversion of lambs fed the same complete feed containing none of the dried material from Example I. The tests were carried out for a 28-day period utilizing as a feed source the following lamb feed:

| | |
|---|---|
| Ground corn cobs _____ lbs__ | 790 |
| Ground corn _____ lbs__ | 640 |
| Alfalfa mold _____ lbs__ | 400 |
| Bone meal _____ lbs__ | 20 |
| Iodized salt _____ lbs__ | 10 |
| Trace minerals _____ lbs__ | 1 |
| Vitamin A supplement I.U./gram _____ grams__ | 400 |
| Vitamin D supplement I.U./gram _____ do____ | 300 |

The following table sets out the average weight gain and the feed conversion of lambs fed the feed containing my growth-promoting agents compared with lambs fed the feed containing none of my growth-promoting agents.

TABLE I

| Treatment | Number of Lambs | Average Daily Gain in Pounds | Pounds Average Daily Feed Consumed | Pounds Feed per Pound Gained |
|---|---|---|---|---|
| Control | 20 | 0.27 | 2.73 | 10.28 |
| Control + Growth Stimulater (0.001%) | 20 | 0.43 | 3.26 | 7.61 |

*Example III*

To demonstrate the effectiveness of my new growth promoting agents, chicks were fed a complete feed containing 0.25% of the dried material of Example I; the weight gain and the feed conversion of these chicks were then compared with the weight gain and the feed conversion of chicks fed the same complete feed containing none of the dried material from Example I. The tests were carried out for a seven-day period utilizing as a feed source, the following chick feed:

| | |
|---|---|
| Barley _____ lbs__ | 60.6 |
| Soybean oil meal solvent _____ lbs__ | 35.0 |
| Dicalcium phosphate _____ lbs__ | 2.0 |
| Ground limestone _____ lbs__ | 1.5 |
| Salt _____ lbs__ | .5 |
| DL-methionine _____ lbs__ | .1 |
| Trace mineral mix _____ lbs__ | .1 |
| Choline chloride _____ lbs__ | .06 |
| Vitamin A supplement (10,000 I.U./gram) _____ grams__ | 40 |
| Vitamin D (1,500 I.U./gram) _____ do____ | 27 |
| Niacin _____ do____ | 2 |
| Calcium pantothenate _____ do____ | .5 |
| Alpha-tocophenyl acetate _____ do____ | .2 |
| Vitamin K _____ do____ | .1 |
| Riboflavin _____ do____ | .2 |
| Vitamin $B_{12}$ _____ do____ | .6 |

The following table sets out the weight gain and feed conversion of chicks fed the feed containing my growth promoting agents compared with chicks fed the feed containing none of my growth promoting agents.

TABLE II

| Treatment | Number of Chicks | Average Seven-Day Gain in Grams | Grams Feed per Grams Gained |
|---|---|---|---|
| Control | 100 | 68.5 | 1.60 |
| Control + Growth Stimulater (0.25%) | 100 | 71.1 | 1.53 |

Now having described my invention, what I claim is:

1. An animal feed containing as an essential active ingredient, a small but effective amount to promote growth of a growth-promoting composition produced by incubating under aerobic conditions a nutrient medium inoculated with *Bacillus licheniformis* to promote a growth-promoting agent and bacitracin, separating the growth-promoting agent from the bacitracin for incorporation into the feed.

2. A process for preparing an animal feed which comprises incubating under aerobic conditions a nutrient medium inoculated with a strain of *Bacillus licheniformis* to produce a growth-promoting agent and bacitracin, separating the said growth-promoting agent from the said bacitracin, concentrating the thus separated growth promoting agent and admixing the said growth-promoting agent with an animal feed whereby said animal feed is enhanced with growth-promoter factors.

3. A process for enhancing the growth of animals which comprises administering to the animal growth-enhancing amounts of a growth-promoting composition produced by incubating under aerobic conditions a nutrient medium inoculated with *Bacillus licheniformis* to produce a fermentation product composed of bacitracin and the growth-promoting composition, and separating the growth-promoting composition from the bacitracin.

4. A process for preparing an animal feed which comprises incubating under aerobic conditions a nutrient medium inoculated with a strain of *Bacillus licheniformis* to produce a fermentation product composed of a growth-promoting agent and bacitracin, centrifuging the fermentation product to produce a bacitracin-containing liquid and a solid material comprising the growth-promoting agent, decanting the bacitracin-containing liquid from the solid material, dehydrating the solid material and admixing the solid material with an animal feed to enhance the animal feed with a growth-promoting factor.

5. The process of claim 4 wherein the solid material is treated with butanol before it is dehydrated and it is dehydrated at a temperature not to exceed a temperature of about 200° C.

References Cited by the Examiner

UNITED STATES PATENTS

| | | | |
|---|---|---|---|
| 2,906,622 | 9/1959 | Lewis | 99—9 |
| 2,985,534 | 5/1961 | Zorn et al. | 99—2 |

OTHER REFERENCES

Pratt and Dufrenoy, Antibiotics, J. B. Lippincott, Co., Philadelphia, Pa. (1949), page 183 relied on.

A. LOUIS MONACELL, *Primary Examiner.*

D. DONOVAN, *Assistant Examiner.*